G. BODMER.
COUPLING FOR TENSION MEMBERS.
APPLICATION FILED APR. 30, 1919.

1,373,590.

Patented Apr. 5, 1921.

Inventor,
Gottfried Bodmer,
By Hemyorth Jr
Atty.

UNITED STATES PATENT OFFICE.

GOTTFRIED BODMER, OF KÜSNACHT, NEAR ZURICH, SWITZERLAND, ASSIGNOR TO HANS MEIER, OF VILLMERGEN, AARGAU, SWITZERLAND.

COUPLING FOR TENSION MEMBERS.

1,373,590.  Specification of Letters Patent.  Patented Apr. 5, 1921.

Application filed April 30, 1919. Serial No. 293,714.

*To all whom it may concern:*

Be it known that I, GOTTFRIED BODMER, a citizen of the Republic of Switzerland, residing at Küsnacht, near Zurich, Switzerland, have invented certain new and useful Improvements in Couplings for Tension Members; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to provide a coupling for tension members. According to the invention, the same possesses at least one plate-shaped coupling piece with at least one projecting rim turned back at an acute angle, which is intended to serve as a resistance to a wedge appertaining thereto and fitting into the turned back part, thus rendering possible the tight clutching of the tension members, which are at least partially held by the coupling piece.

Figure 1:
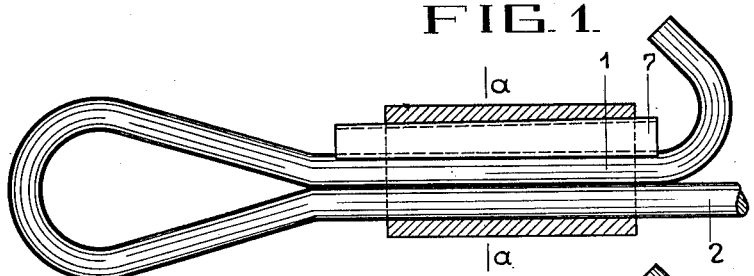
Figure 2:
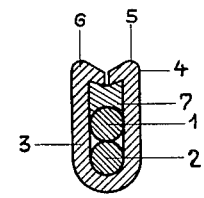
Figure 3:
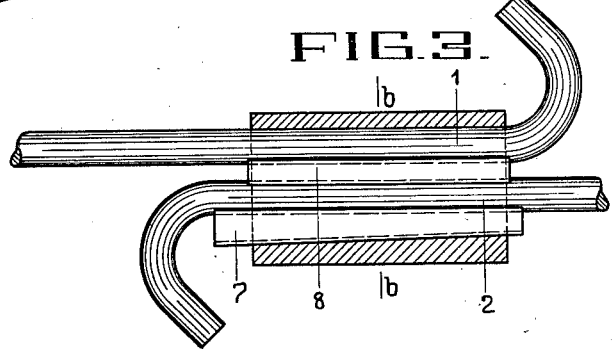
Figure 4:
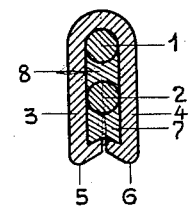
Figure 5:
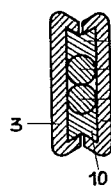
Figure 6:
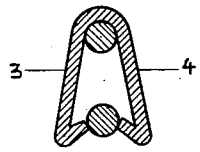
Figure 7:
Figure 8:
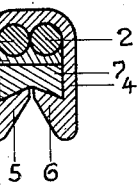
Figure 9:
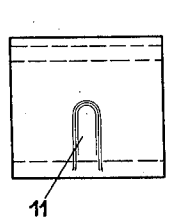
Figure 9:
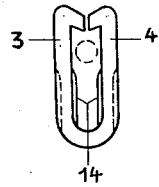
Figure 10:
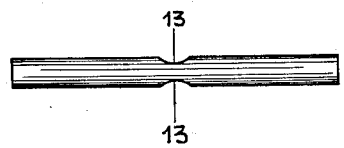
Figure 11:
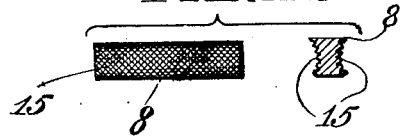

The annexed drawing shows examples of the object of the invention. Figure 1 shows a longitudinal section through a coupling connecting together the ends of a wire loop; Fig. 2 is a cross section through the line $a$—$a$ of Fig. 1; Fig. 3 is a longitudinal section through a second form of coupling with the ends of two wires connected with one another; Fig. 4 is a cross section through the line $b$—$b$ of Fig. 3; Fig. 5 is a cross section through a coupling of a third form; Fig. 6 shows a small detail, and Figs. 7 and 8 are respectively cross section through couplings of fourth and fifth forms. Fig. 9 is a further example of a coupling, Fig. 10 a wire piece for the coupling and Fig. 11 illustrates the roughened surfaces on the spacing member. The wire parts 1 and 2 of the loop (Fig. 1) are sidewise embraced by the legs 3 and 4 of a V-shaped element, which forms the coupling piece. At one edge of the coupling piece parts 5 and 6, which lie opposite to one another, are turned back at acute angles. A wedge 7 is arranged between the parts 5 and 6 of the coupling piece and the wire part 2 which has to be coupled.

This wedge fits on the one side into the turned back parts 5 and 6, and on the other side is shaped to and is in direct contact with the circumference of the wire 2. The free end of the wire 1 which has to be coupled, is bent in an upward direction. In the examples shown in Figs. 3 and 4, the parts 3—6 of the coupling are of the same shape as in the first form, but in this instance an intermediate piece 8 is inserted between the two wire ends 1 and 2 which are to be connected together.

The longitudinal surfaces of this distance piece 8 facing the parts to be coupled, lie adjacent to the wires and are shaped to the same. It is desirable for these surfaces to be roughened as at 15, Fig. 11, in order on the one hand to prevent the parts 1 and 2 going in opposite directions, and on the other hand to produce a good electric connection between parts 1 and 2, in cases where, for instance, the coupling is used for overhead wires.

The form shown in Fig. 5 has two coupling pieces, consisting of two separate plates 3 and 4, the two rim parts of which are turned back at an acute angle, and between each of these rim parts and the parts 1 and 2, wedges 9 and 10 are arranged respectively.

The advantage of the bent piece with the legs 3 and 4 as shown in Figs. 1–4 as compared with couplings in which a closed tube is employed instead of this piece, is that the legs 3 and 4 can be pried open (see Fig. 6) in order to open or close a wire loop as shown in the first example, and the loop can then be closed or opened as desired. The example as shown in Fig. 7 shows a cross section through a coupling with a coupling piece 4, the longitudinal side edge of which is bent over in the form of a hook in which the wire lies. Between the latter and wire 2, a distance piece 8 is arranged. The wedge 7 insures the tight clutching of the wires in the coupling piece.

In the form shown in Fig. 8 the coupling piece 3—4 is of the same shape as shown in Figs. 1–4. The wires 1 and 2 are in this case situated alongside one another, and the wedge 7, with the help of the distance piece 8 acts on the wires and coupling pieces.

In the form shown in Fig. 9, grooves 11 are pressed in the middle of the legs 3 and 4, thus causing elevations 14 in the inner edges of the latter. The wires 12 (Fig. 10) for which this coupling is used, should have side grooves 13. When the wires are introduced into the coupling, they must be pushed as far as possible into the inner upper part of same, until the grooves 13 come directly over the grooves 11; the wires are then pushed downward, so that the elevation 14 enters the grooves 13, and the wires are thus prevented from slipping lengthwise.

It will thus be seen that in most of the constructional forms shown, there is a single sheet of metal used to form the coupling. At one edge of the coupling member which may or may not be formed by the middle of the sheet of metal, there is an arcuate bend and at the other edge of the coupling member there is either one or two acute angle bends, the bends on the opposite edges forming opposite abutments.

The above invention applies not only to electric wires as tension members, but also to wire ropes or tension rods of any description. When the coupling is used for wire ropes it is advantageous to arrange the intermediate piece between the wire ropes, and the longitudinal sides of the shaped pieces adjacent to the ropes, so that it may set well in the ropes on all sides.

I claim—

1. A coupling for over lapping tension members comprising a sheet metal member having at one edge an arcuate bend and a V-shaped bend at the other edge, and a wedge having a round groove on one face, and an inclined opposite face, said bends arranged to form abutments for said wedge and a tension member.

2. A coupling for over-lapping tension members, comprising a sheet metal member having at one edge an arcuate bend and a V-shaped bend at the other edge, a separate spacing piece for arrangment between the over-lapping portions to be connected, and a wedge coöperating with the V-shaped bend to force the assemblage into clamped relation.

3. A coupling for over-lapping tension members, comprising a sheet of metal having an arcuate bend at its middle at one edge of said coupling and two V-shaped bends at the opposite edge of the coupling, a separate spacing piece for arrangement between the over-lapping portions of the tension members to be connected, and a wedge for insertion between said V-shaped bends and one of said tension members.

4. A coupling for over-lapping tension members, comprising a sheet of metal having an arcuate bend at one edge of the coupling and a V-shaped bend at the other edge, a separate spacing member having roughened, tension member, engaging surfaces for arrangement between the tension members to be coupled, and a wedge having a groove in one face and an inclined face for engagement with said V-shaped bend.

In testimony that I claim the foregoing as my invention, I have signed my name.

GOTTFRIED BODMER.